US010471627B2

(12) United States Patent
Juillard et al.

(10) Patent No.: US 10,471,627 B2
(45) Date of Patent: Nov. 12, 2019

(54) PROCESS AND SYSTEM FOR CONTROLLING THE ADDITION OF WATER DURING A MIXING CYCLE FOR PRODUCING A RUBBER MIXTURE

(71) Applicant: COMPAGNIE GENERALE DES ETABLISSEMENTS MICHELIN, Clermont-Ferrand (FR)

(72) Inventors: Jean-Claude Juillard, Clermont-Ferrand (FR); Christian Vacheron, Clermont-Ferrand (FR)

(73) Assignee: Compagnie Generale Des Etablissments Michelin, Clermont-Ferrand (FR)

( * ) Notice: Subject to any disclaimer, the term of this patent is extended or adjusted under 35 U.S.C. 154(b) by 0 days.

(21) Appl. No.: 15/767,531

(22) PCT Filed: Nov. 30, 2016

(86) PCT No.: PCT/EP2016/079297
§ 371 (c)(1),
(2) Date: Apr. 11, 2018

(87) PCT Pub. No.: WO2017/102333
PCT Pub. Date: Jun. 22, 2017

(65) Prior Publication Data
US 2018/0290338 A1 Oct. 11, 2018

(30) Foreign Application Priority Data
Dec. 15, 2015 (FR) ...................................... 15 62367

(51) Int. Cl.
*B29B 7/58* (2006.01)
*B29B 7/56* (2006.01)
(Continued)

(52) U.S. Cl.
CPC .............. *B29B 7/584* (2013.01); *B29B 7/566* (2013.01); *B29B 7/606* (2013.01); *B29B 7/724* (2013.01);
(Continued)

(58) Field of Classification Search
CPC ....... B29B 7/24; B29B 7/7461; B29B 7/7495; B29B 7/7485; B29B 7/724; B29B 7/606;
(Continued)

(56) References Cited

U.S. PATENT DOCUMENTS

| 1,590,638 | A | | 6/1926 | Marquette |
| 1,953,721 | A | * | 4/1934 | Olson ..................... B29B 7/724 236/1 R |

(Continued)

FOREIGN PATENT DOCUMENTS

| EP | 0 979 714 A1 | 2/2000 |
| FR | 2 975 034 A1 | 11/2012 |

(Continued)

OTHER PUBLICATIONS

International Search Report issued by WIPO dated Mar. 1, 2017, in connection with International Application No. PCT/EP2016/079297 (in English).
(Continued)

*Primary Examiner* — Charles Cooley
(74) *Attorney, Agent, or Firm* — Venable LLP (57) ABSTRACT

A process and a system are provided for controlling an addition of water to a rubber mixture during a mixing cycle in which the mixture is transported as a continuous sheet. The process includes obtaining data for the mixture, including a predetermined water flow rate, a predetermined air flow rate, and a target temperature and a target water content for the mixture; adding water to the continuous sheet during the mixing cycle; detecting an amount of water added at an elapsed time during the mixing cycle; determining, using a detection result, a predicted temperature and a predicted water content for the mixture at an end of the mixing cycle; comparing the target temperature with the predicted temperature, and the target water content with the predicted water content; and, before a next mixing cycle, adjusting an actual water flow rate when a comparison result indicates non-equivalence.

18 Claims, 3 Drawing Sheets

(51) Int. Cl.
   *B29B 7/60*   (2006.01)
   *B29B 7/72*   (2006.01)
   *B29B 7/74*   (2006.01)
   *B29B 13/04*  (2006.01)
   *B60C 11/00*  (2006.01)
   *B29D 30/00*  (2006.01)
   *B29D 30/06*  (2006.01)

(52) U.S. Cl.
   CPC ............ *B29B 7/7495* (2013.01); *B29B 13/04* (2013.01); *B29D 30/0005* (2013.01); *B29D 30/0601* (2013.01)

(58) Field of Classification Search
   CPC .......... B29B 7/566; B29B 7/183; B29B 7/82; B29B 7/823; B29B 7/826; B29B 7/84; B29B 7/584; B29B 13/04; B29B 7/625; B60C 11/00; B29D 30/0601; B29D 30/0005
   See application file for complete search history.

(56) References Cited

U.S. PATENT DOCUMENTS

| | | | | |
|---|---|---|---|---|
| 4,840,491 A | * | 6/1989 | Hagiwara | ............... B29B 7/568 366/69 |
| 5,415,823 A | * | 5/1995 | Peter | ..................... B29B 7/7461 264/175 |
| 2014/0360656 A1 | * | 12/2014 | Magne | ..................... B29B 7/566 156/243 |
| 2018/0290336 A1 | * | 10/2018 | Bornes | ....................... B29B 7/24 |
| 2018/0290338 A1 | * | 10/2018 | Juillard | ................... B29B 7/566 |

FOREIGN PATENT DOCUMENTS

| | | | | |
|---|---|---|---|---|
| FR | 2 984 206 A1 | | 6/2013 | |
| FR | 3045173 A1 | * | 6/2017 | |
| GB | 423637 | | 2/1935 | |
| JP | 2005-178257 A | | 7/2005 | |
| JP | 4802754 B2 | * | 10/2011 | ................ B29B 7/82 |
| JP | 4853038 B2 | * | 1/2012 | ............. B29B 7/005 |
| JP | 4867436 B2 | * | 2/2012 | ................ B29B 7/82 |
| WO | 2011/108387 A1 | * | 9/2011 | |

OTHER PUBLICATIONS

Written Opinion published by WIPO dated Jun. 22, 2017, in connection with International Application No. PCT/EP2016/079297 (in English).

\* cited by examiner

PROCESS AND SYSTEM FOR CONTROLLING THE ADDITION OF WATER DURING A MIXING CYCLE FOR PRODUCING A RUBBER MIXTURE

TECHNICAL FIELD

The described invention relates generally to the production of rubber mixtures and vehicle tires made from them. More particularly, the disclosed invention relates to the control of water that is added to the rubber mixture as a function of controlling its temperature and water content during production.

BACKGROUND

The production of rubber for a vehicle tire includes a plurality of successive mixing steps. For example, patent GB423,637 discloses a means for maintaining a predetermined temperature of rubber during mixing on a roller tool. This means operates by expansion and contraction of an element that responds to the change in the rubber temperature and sends water to the open mill. An initial mixture of elastomeric materials with a carbon black filler and/or silica is often carried out inside a mixer, where the temperature of the mixture rises, for example up to values of between 150° C. to 200° C. An automated external mixer (also called "roll mixer" or "roller tool") in which this mixture is then transferred works the mixture, causing it to flow between two rolls so as to convert it into a continuous sheet. Vulcanization products (including, without limitation, sulfur) may be added to the mixture later in the mixing cycle to obtain the final mixture for commercial use.

During the mixing process, repeated rolling results in plasticization of the mixture and causes the temperature to rise accordingly. The mixture is cooled to prevent premature partial vulcanization and/or degradation of insoluble additives. To perform cooling, some methods include cooling fans or integrated cooling systems (e.g., fluid circulating within the cylinders). Other methods employ spray and aspiration equipment that add water to the mixture being worked.

The properties of the mixture, however, are very sensitive to the proportions of its constituent ingredients. Added water can compromise the quality of the finished tire. Vaporization offers an effective solution to cool the mixture and can be used with temperature control during mixing so that the beneficial properties of the tires are preserved.

SUMMARY

The invention provides processes for controlling the addition of water in a rubber mixture during a mixing cycle in which the rubber mixture is transported in the form of a continuous sheet and along at least a portion of which at least one spray system sprays water whose vapors are evacuated controllably by at least one aspiration system.

A process according to the invention includes obtaining predetermined data relative to the rubber mixture, including at least a predetermined water flow rate delivered by the spraying system, a predetermined air flow delivered by the aspiration system and target values of temperature and water content of the rubber mixture. The method also includes detecting an actual water flow attained throughout the mixing cycle. Based upon the detected values, the values of temperature and water content of the rubber mixture at the end of the mixing cycle are predicted. The target values and the predicted values are compared and, between successive cycles, the actual water flow is adjusted when a comparison indicates non-equivalence.

Some processes also include spraying of the continuous sheet during transport thereof proximate an upper spray station and a lower spray station. For these embodiments, each spray station includes one or more spray rails positioned at each upper and lower spray station. Each spray rail is in communication with a water supply source and an air supply source in order to provide water and air to one or more nozzles. Air containing evaporated water is removed by aspiration, and the continuous sheet is transported in a predetermined direction during spraying and aspiration.

For some embodiments of the invention, each aspiration system may include one or more aspiration hoods positioned downstream of each rail. Each aspiration hood is in communication with an air supply source for the aspiration of air at a predetermined air flow rate. Some of these hoods may include at least one heating element that prevents condensation of sprayed water.

For some embodiments of the invention, the process includes the addition of one or more vulcanization products during the transport of the continuous sheet. For such processes, the target values of temperature and water content of the rubber mixture must be achieved prior to adding the vulcanization products.

One or more processes include transport of the continuous sheet to an evacuation station. For such embodiments, the discharge station includes one or more spray rails with one or more aspiration hoods positioned downstream.

The invention also provides systems for implementing one or more of the described processes. For some embodiments of the invention, certain systems may include a detection system configured, throughout the mixing cycle, to detect and generate one or more signals corresponding to an actual water flow rate, an actual air flow rate and the presence of a pressure suitable for atomizing air droplets. Some systems may also include a monitoring system configured to perform at least one operation among predicting, comparing and adjusting on the basis of signals received from the detection system.

For some embodiments, some systems may also include a vulcanizing charging station at which one or more vulcanization agents are added to the rubber mixture once the rubber mixture exhibits target values of temperature and water content.

Other aspects of the present invention will become apparent from the following detailed description.

BRIEF DESCRIPTION OF THE DRAWINGS

The nature and various advantages of the present invention will become more apparent upon reading the following detailed description in conjunction with the accompanying drawings, wherein like numbers designate like parts throughout, and in which.

DETAILED DESCRIPTION

Reference now will be made in detail to embodiments of the invention, one or more examples of which are illustrated in the drawings. Each example is provided by way of explanation and not by limitation of the disclosed invention. Selected combinations of aspects of the disclosed technology correspond to a plurality of different embodiments of the present invention. The skilled artisan will appreciate that various modifications and variations can be made in the present invention without departing from the scope or spirit of the invention. For instance, features or steps illustrated or described as part of one embodiment can be used with one or more other embodiments to yield at least one further embodiment. Additionally, certain features may be interchanged with similar devices or features not expressly mentioned that provide the same or a similar function. Thus, it is intended that the present invention covers such modifications and variations as come within the scope of the appended claims and their equivalents.

Figure 1:
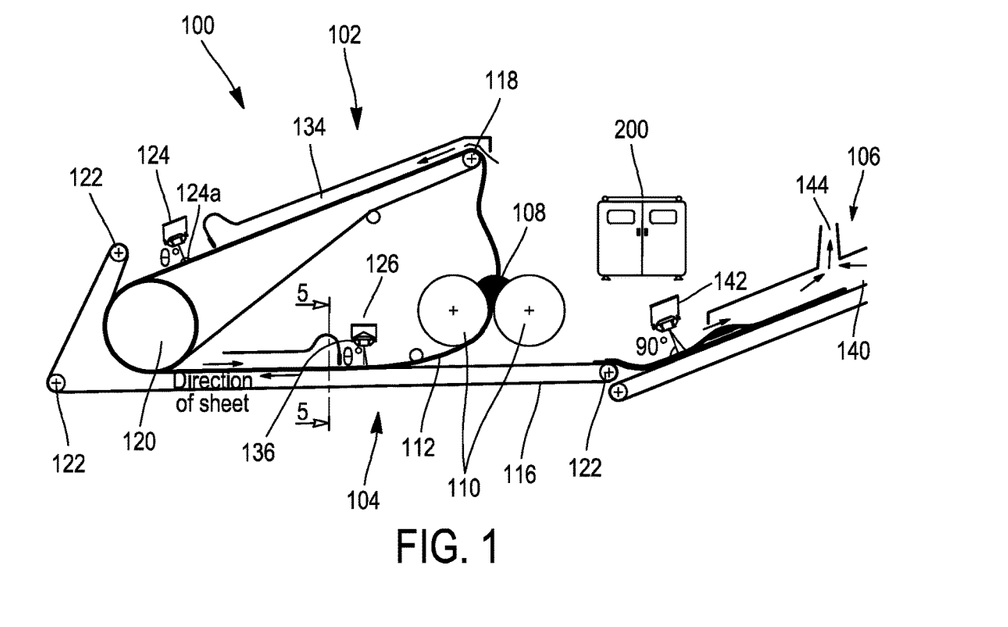
FIG. 1 shows a schematic of an exemplary system that produces rubber according to an exemplary process as described herein.

Now referring further to the figures, in which like numbers identify like elements, FIG. 1 shows an exemplary system 100 for producing one or more rubber products to be incorporated into one or more vehicle tires. As used herein, the term "tires" includes but is not limited to tires used with lightweight vehicles, passenger vehicles, utility vehicles (including heavy trucks), leisure vehicles (including but not limited to bicycles, motorcycles, ATVs, etc.), agricultural vehicles, industrial vehicles, mining vehicles and engineering machines. It is also contemplated that the products produced by the presently disclosed invention include full and partial tire treads such as those used in known retreading processes.

System 100 includes at least one upper spray station 102 (shown and described in more detail with reference to FIG. 2) and one lower spray station 104 (shown and described in more detail with reference to FIG. 3) that are integrated with at least one spray system and at least one aspiration system, to control the temperature and the addition of water in a rubber compound produced by them. The spray system sprays water that is discharged after evaporation in a controllable manner by the aspiration system.

System 100 may also include an optional evacuation station 106 (shown and described in more detail with reference to FIG. 4) that also incorporates spraying and aspiration devices, to perform an optional additional treatment of the rubber mixture as needed.

It is understood that the system 100 may operate independently or that there may be one or more of these systems in a production plant.

In a rubber producing method, an elastomeric material (e.g., natural rubber, synthetic rubber and combinations and equivalents thereof) is mixed with one or more ingredients in an internal mixer (not shown) to thereby obtain a rubber mixture 108. The ingredients may contain carbon black and/or silica in varying amounts depending on the desired properties and performance for the vehicle tire. The rubber mixture 108 is transferred to an external mixer having a pair of cylinders 110 with an adjustable gap 110*a* therebetween. Each cylinder 110 rotates about its axis of rotation, and the cylinders are disposed such that their axes of rotation are parallel to one another as they rotate in opposite directions. The cylinders 110 may have identical diameters and identical lengths to ensure consistent and repeatable performance in successive mixing cycles. One or both cylinders 110 may have a fluid cooling means or other cooling means as known in the art. The system 100 moves the rubber mixture 108 between the cylinders 110 to form a continuous sheet 112 having a selected thickness and width.

System 100 circulates the continuous sheet 112 along a predefined path having one or more continuous conveying means (e.g., one or more conveyor belts or similar transport means). In the embodiment of FIG. 1, the predefined path is formed at least partly by a continuous belt 114 disposed at the upper spray station 102 and another continuous belt 116 positioned at the lower spray station 104. The belts 114, 116 are driven at least by an upper roller 118 and a lower roller 120 of larger relative diameter. One or more auxiliary rollers 122 may complement the conveyance of belts 114, 118 as is known in the art.

Although the belts 114, 116 are shown as separate means of conveyance, a single continuous belt can replace them. It is understood that the predefined path is not limited to belts and that other means of transport can replace without departing from the scope of the invention described. The predefined path can remain "without end" (i.e., uninterrupted) when at least one mixing cycle is in progress and may circulate without end during one or more successive mixing cycles. Depending on the properties of the selected rubber mixture, the speed of the belts 114, 116 may be adjusted during a mixing cycle or between successive mixing cycles according to need.

Figure 2:
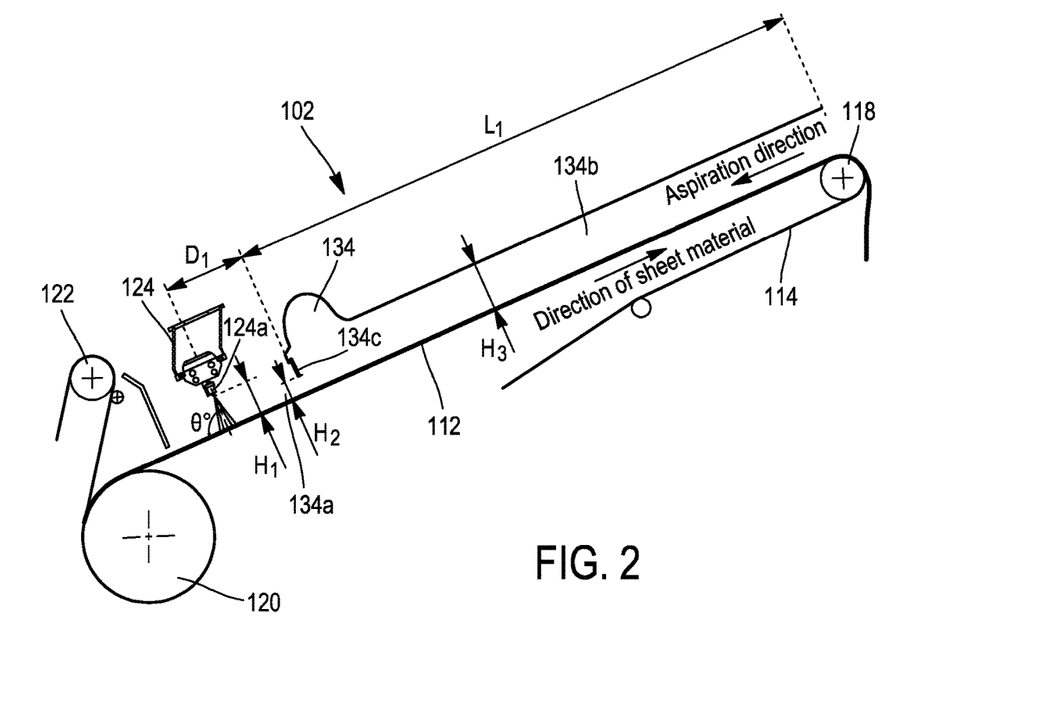
FIGS. 2 to 4 show partial views of the system of FIG. 1.
Figure 3:
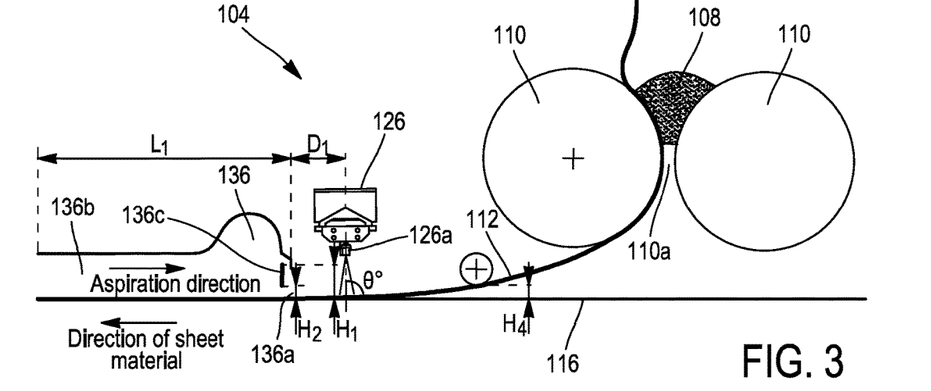

Referring to FIGS. 2 and 3, system 100 includes a spray system that sprays water along at least a portion of the continuous sheet 112 as the sheet travels the predefined path. The spray system includes one or more upper spray rails 124 positioned at the upper spray station 102 and one or more lower spray rails 126 positioned at the lower spray station 104. As used herein, the terms "spray rails" and "rails" are used interchangeably.

Each rail 124, 126 is in communication with a water and air supply source (not shown) for the supply of water and air to one or more respective nozzles 124*a*, 126*a* that may be identical or may include a variety of nozzle sizes of types. In some embodiments, each spray rail is equipped with a spray bar 128 including eight (8) nozzles that are linearly disposed and evenly spaced along a common axis extending through all or part of the continuous sheet 112 (for example, along at least a portion of the width of the sheet) (see FIG. 5). In some embodiments, each nozzle of the rail supplies water at the same pressure and at the same rate. In such embodiments, in the case of malfunction of a nozzle, fluid circulation (e.g., water and air) is stopped and prevents the introduction of excess water in the rubber mixture. After stopping the flow of fluid, the properties of the rubber mixture can be verified manually or automatically before resuming production. For example, an actual temperature and/or actual water content in the rubber mixture can be detected when the fluid circulation stops, which time is determined in the mixing cycle. At this time, if the detected values of temperature and/or water content did not reach the respective target values for the elapsed time, it is unlikely that the rubber mixture reaches the predicted values of temperature and/or water content at the end of the mixing cycle. Thus, between successive mixing cycles, fluid flow can be adjusted.

It is understood that the rails 124, 126 are not limited to the represented bars and nozzle configurations and can be customized to suit the operation of the system 100. Each rail 124, 126 should be configured to deliver a predetermined flow rate of water spray as determined for the selected mixing cycle. It is understood that the water flow can be changed between successive mixing cycles, and that in some mixing cycles, a rail may deliver a different water flow than that delivered by another rail in the same system. In some embodiments, the water flow may be about 70 liters/hour to about 400 liters/hour.

In some embodiments of system 100, nozzles 124a, 126a are positioned at a predetermined height $H_1$ between the nozzle outlet and the continuous sheet 112 and create an angle θ between the water spray and the continuous sheet. For example, as shown in FIGS. 2 and 3, nozzles 124a at the level of the upper spray station 102 are positioned at a height $H_1$ of at or about 250 mm, while nozzles 126a at the level of lower spray station 104 are positioned at a height $H_1$ of or about 260 mm. In this example, the height $H_1$ is selected so that the spray angle θ remains substantially normal to the continuous sheet 112 during current and successive mixing cycles. It is understood that such parameters of height are adjustable and can be selected to achieve different spray angles θ without departing from the scope of the described invention. The height can also be considered in relation to the spacing between nozzles to prevent overlapping of the spray zones of adjacent nozzles.

Still referring to FIGS. 2 and 3, system 100 includes an aspiration system to remove the water particles generated by the rails 124, 126. The aspiration system includes at least an aspiration hood 134, 136 positioned downstream of each respective rail 124, 126 and in communication with an aspiration source (not shown). In some embodiments, a bifurcated duct 135 applies aspiration to hoods 134, 136, the aspiration rate being adjustable automatically or manually (e.g., by a manual controller 137 as shown) (see FIG. 6). This rate represents a volume of air aspirated during an elapsed time.

As shown particularly in FIGS. 2 and 3, the aspiration creates a circulation of air in the direction opposed to the direction of circulation of continuous sheet 112. Thus, the upper belt transports the continuous sheet 112 in the direction of the upper roller 118 and the lower belt transports the sheet in the direction of the lower roller 120, while the hoods 134, 136 aspirate in respective opposite directions.

Each aspiration hood 134, 136 has a respective entry 134a, 136a through which a portion of the evaporated water is combined with that water already evaporated in a respective elongated conduit 134b, 136b in order to be finally evacuated. In some embodiments of system 100, each entry 134a, 136a may be positioned at a predetermined distance $D_1$, as measured between the entry and a respective rail 124, 126 in proximity thereof (and, in particular, a position of nozzles 124a, 126a thereof). Considering in detail FIGS. 3 and 6, each entry 134a, 136a may also have a lip 134c, 136c positioned at a predetermined height $H_2$ between the lip and the continuous sheet 112 that ensures unimpeded evacuation of the water particles that pass by entry 134a or 136a and elongated pipe 134b or 136b. Each pipe 134b, 136b may have a predetermined height $H_3$ and a predetermined length $L_1$ which provides an unobstructed conduit for both the aspiration of air and the discharge of water particles. In some embodiments, at the level of upper spray station 102, the entry 134a can be positioned a distance $D_1$ of approximately 510 mm and a height $H_2$ of about 120 mm. Conduit 134b may have a height $H_3$ of about 240 mm and a length $L_1$ of about 5500 mm. At lower spray station 104, inlet 136a may be positioned at a distance $D_1$ of about 540 mm and a height $H_2$ of at or about 130 mm. Conduit 136b may have a height $H_3$ of about 270 mm and a length $L_1$ of about 2800 mm. It is understood that the values of height, length and distance are given by way of example and can be adjusted to the unique properties of rubber mixture 108.

Figure 6:
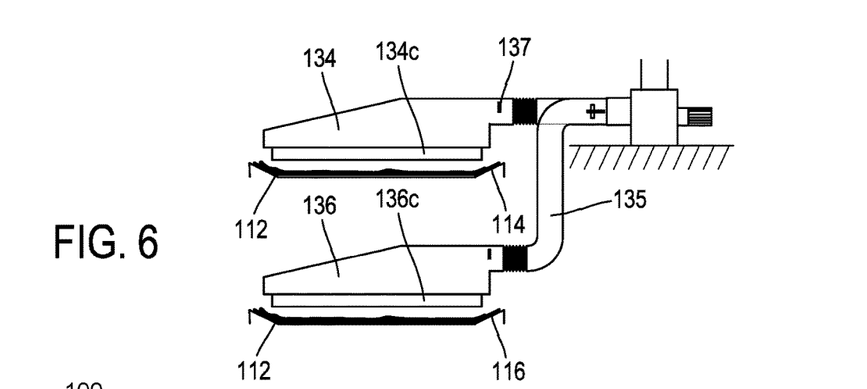
FIG. 6 shows an exemplary aspiration device used in the system of FIG. 1.

Referring further to FIG. 6, at least one aspiration hood 134, 136 may also include a respective lip 134c, 136c having an integrated heating element (not shown). Each lip 134c, 136c may be fabricated from a flexible material (e.g., silicon) having an electric heating wire or a similar heating element incorporated therein. The selective heating of lips 134c, 136c during the transport of the sheet 112 is a means to prevent condensation. While the lips 134c, 136c do not contact sheet 112, they are sufficiently heated to prevent the entry of water droplets into rubber mixture 108. In some embodiments, the lip 134c, 136c are heated to about 70° C.

The addition of water by the rails 124, 126 loads the ambient air with moisture. The air containing the evaporated water is aspirated in order to prevent the introduction of excess water into the rubber mixture 108. Each rail and aspiration hood combination serves as a checkpoint that optimizes cooling of the rubber mixture throughout the process production line.

Figure 4:
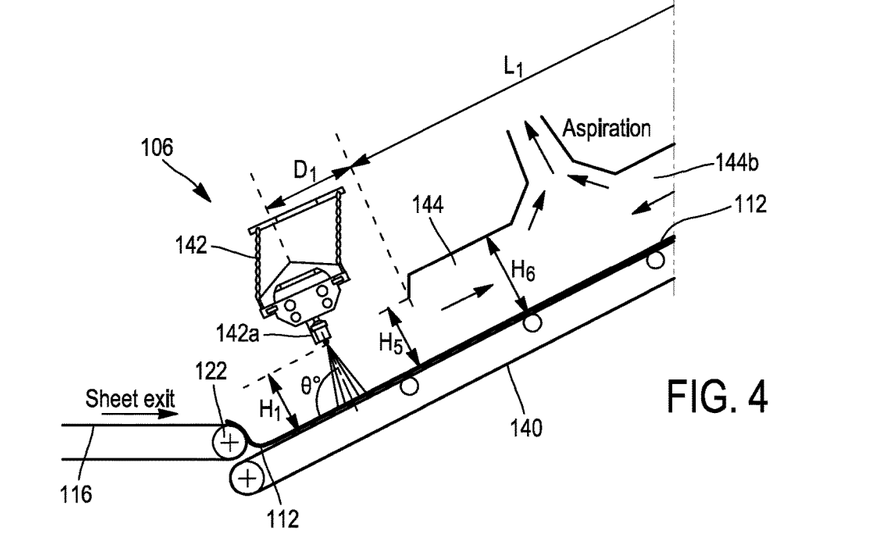

Further referring to FIG. 4, some of the embodiments of system 100 may include an optional evacuation station 106 for discharging continuous sheet 112. In such embodiments, evacuation station 106 includes an evacuation belt 140 that receives the sheet from belt 116. At least one spray rail 142 having nozzles 142a is positioned to spray the continuous sheet 112 during the transport thereof on the evacuation belt. Spray rail 142 has a configuration similar to that described above with respect to rails 124, 126. At least one aspiration hood 144 is located downstream of the rail 142 and has a configuration similar to that described above with respect the hoods 134, 136.

In some embodiments of the evacuation station, nozzles 142a may be positioned at a predetermined height $H_4$ at a predetermined spray angle θ' that ensures the spraying of water between the nozzle outlet and continuous sheet 112. For example, as shown in FIG. 4, the nozzles 142a are positioned at a height $H_1$ of about 200 mm to about 290 mm. In this example the spray angle θ' remains substantially normal to continuous sheet 112 during the discharge.

In some embodiments of evacuation station 106, an entry 144a of the aspiration hood 144 may be positioned at a height $H_5$ of about 335 mm. In some embodiments of the evacuation station, a conduit 144b of aspiration hood 144 can have a height $H_6$ of about 500 mm and a length $L_2$ of about 16225 mm. It is understood that these values are given as examples and can be adjusted based on the unique properties of rubber mixture 108.

System 100 may also include a detection system having at least one flow sensor. The detection system is used to perform the detection and to generate one or more signals indicative of the actual water flow. The detection system includes sensors to detect an actual flow rate delivered by each rail 124, 126 (and also in some embodiments that involve the evacuation station 106).

Figure 5:
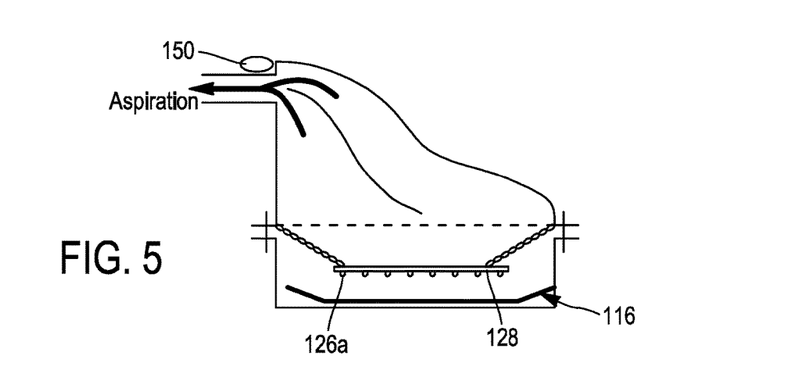
FIG. 5 shows a schematic sectional view of Section 5-5 of FIG. 1.

The detection system of system 100 may also include an air flow sensor 150 at the level of each aspiration hood that verifies the flow rate of aspirated air (see FIG. 5). Such verification may involve determining that a detected air flow meets the predetermined air flow rate values for the indicated rubber mixture. Each air flow sensor 150 may generate one or more signals that are indicative of the actual sensed air rate. Each aspiration hood 134, 136 (and also the aspiration hood 144 in the embodiments that include evacuation station 106) can be configured to deliver a predetermined air flow rate. In some embodiments, this flow rate may be about 5000 m³/hr to about 30000 m³/h.

The detection system also includes at least one sensor that detects the presence of an ambient pressure suitable for atomizing air droplets. The detection system generates one or more signals indicative of suitable pressure (at a value specified in the documentation of the nozzle manufacturer).

The detection can be continuous or intermittent so that an actual water flow rate in real time can be determined at any time during the mixing cycle in progress (i.e., the mixing cycle performed at the time of detection).

System 100 may also include a monitoring system that is configured to receive the detected signals (e.g., the signals indicating water flow and/or aspirated air flow rates and/or the presence of a predetermined pressure) and for sending one or more proportionate control signals. Monitoring may be continuous or intermittent so that the control signal effects a real-time adjustment of the water flow and/or aspirated air flow in response to detected actual flow rates at any time during the cycle during mixing. The monitoring system can be programmed to stop spraying when detecting a fault in system 100. It is simple to check the operation of each mixer and every nozzle without undergoing a prolonged delay between mixing cycles.

The monitoring system may include at least one programmable controller in signal communication with at least one of the spray system and the aspiration system. The programmable controller may have programmed therein established data for a plurality of rubber mixtures each having a unique mixing cycle profile. The data may include established water flow rates and air flow rates such that the actual detected water flow rate and actual detected air flow rate can be respectively compared thereagainst. Additional data may include at least a predetermined flow rate to be delivered by each spray rail during a mixing cycle, a target temperature of the rubber mixture at an elapsed time and a target water content of the rubber mixture. Using these data, the monitoring system may be configured to receive the detected signals and execute a corresponding adjustment. All or part of the surveillance system can be housed in a central control center such as control center 200 shown in FIG. 1. All or part of the surveillance system can be controlled remotely via a network.

In some embodiments, the target temperature of the rubber mixture, at the end of mixing in the external mixer and during the mixing cycle in progress, is about 70° C., the temperature at which the reproducibility of the process is assured. In some embodiments, the target water content in the rubber mixture after an elapsed time during the current mixing cycle does not exceed about 0.20% by weight of the rubber composition, at which level the existing equipment can cool the rubber during working thereof.

Figure 7:
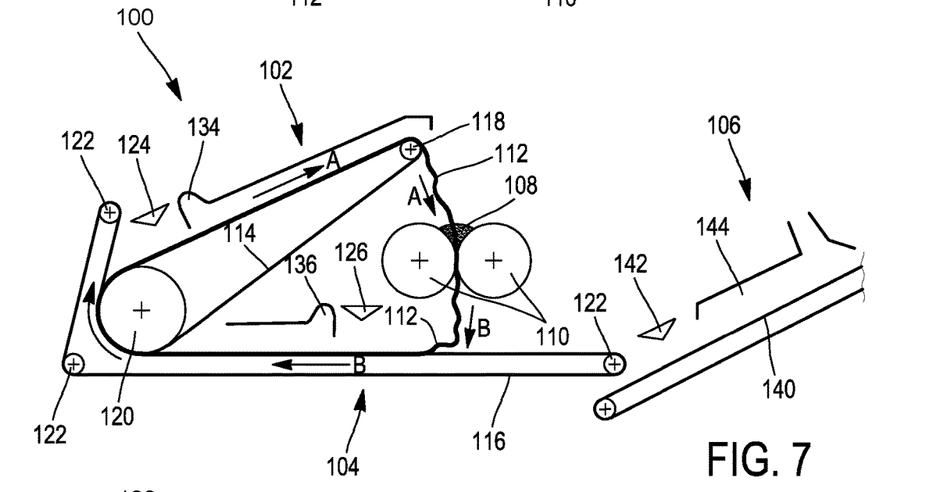
FIGS. 7 and 8 show steps of a mixing cycle effected by the system of FIG. 1.
Figure 8:
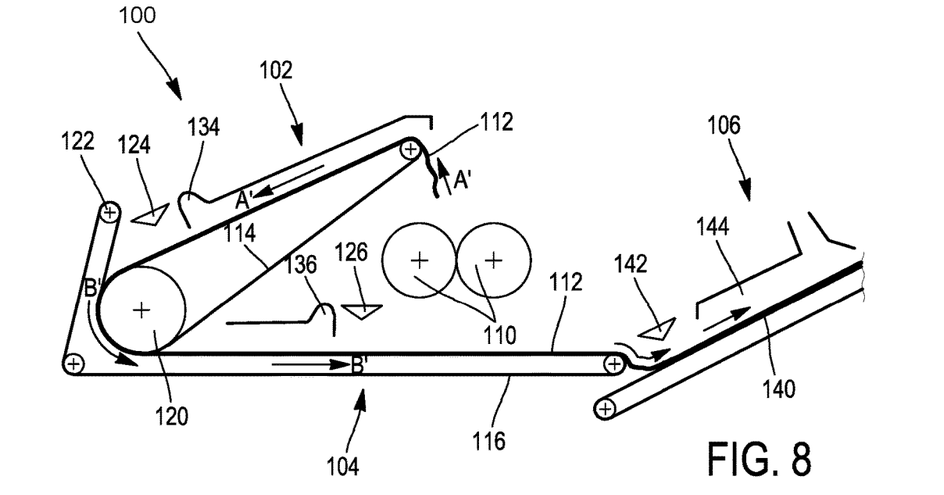

System 100 can be employed to perform one or more rubber production processes, as in the example described in relation to FIGS. 7 and 8. In some embodiments, one or more vulcanization products (e.g., sulfur) may be added during circulation of continuous sheet 112. In one embodiment, the target temperature and the target water content are attained before adding the vulcanization products. The cycle time can thus be shortened while maintaining the beneficial properties of the selected rubber mixture, allowing an optimal productivity.

Referring to FIG. 7, during a mixing cycle in progress, rubber mixture 108 is obtained from a mixture of elastomeric material and other ingredients (e.g., carbon black, silica, etc.) and transported by belt 114 in a direction for treatment at upper spray station 102 (indicated by the arrows A in FIG. 7). Belt 114 transports the rubber compound 108 between cylinders 110 to form continuous sheet 112. Belt 116 transports the sheet in a direction for treatment at lower spray station 104 (indicated by arrows B in FIG. 7). Based on the unique properties of rubber mixture 108, each rail 124, 126 sprays water at a predetermined flow rate and each respective aspiration hood 134, 136 aspirates the air containing evaporated water at a predetermined flow rate.

Referring further to FIG. 8, the mixing cycle terminates. The direction of transport of continuous sheet 112 is then reversed. Belt 114 transports sheet 112 in the direction of treatment at the level of lower spray station 104 (indicated by arrow A' in FIG. 8). Belt 116 transports the sheet toward evacuation belt 140 (indicated by arrow B' in FIG. 8). In the embodiments employing evacuation station 106, rail 142 sprays water at a predetermined flow rate and exhaust hood 144 delivers air at a predetermined air flow rate. The predetermined flow rates may vary and they may be different at each spray station, with the flow rates being selected to give the rubber mixture a target temperature and target water content at the end of the mixing cycle in progress.

It is understood that other cycles may include more or fewer adjustment parameters that ensure the control of the addition of water in the final rubber mixture. During a mixing cycle, the temperature and/or the addition of water can be detected and compared to respective target temperature and water content values. For example, if at an elapsed time, the temperature of the mixture is greater than a predicted target temperature, the water flow rate (e.g., as delivered by rail 124 or rail 126) can be adjusted to a rate higher than that which would be delivered at a lower temperature. The water flow adjustment may be performed alone or in combination with an adjustment of the aspiration air flow rate (e.g., as delivered by aspiration hood 134 or aspiration hood 136).

When successful adjustments are made over time, such adjustments may be repeated in successive mixing cycles to ensure that the addition of water to any rubber mixture is limited to the target value thereof. The detection system can detect, at each checkpoint, the actual water flow rate and the actual flow rate of aspirated air at an elapsed time in the current mixing cycle. The detection system can also detect at each checkpoint, the presence of the correct pressure for droplet atomization (a value specified in the documentation of the nozzle manufacturer). In this manner, the detection system can verify that the fluid flow rate and air flow rate realized at the moment of detection are satisfactory to meet the target temperature and the target water content.

The monitoring system can receive the detection signals from the detection system and, depending on the actual water flow rate detected and/or the actual aspiration air flow rate detected, predict an actual temperature value of the rubber mixture and an actual water content value at the end of the current mixing cycle. The prediction may include the prediction that the target temperature and the target addition of water will be reached or not. The monitoring system is configured to compare the target quantities of temperature and water content with respective predicted quantities. In advance of a successive mixing cycle, the monitoring system may generate control signals to adjust one or both of the actual fluid flow rate and the actual air flow rate when a comparison indicates non-equivalence.

The invention contemplates the use of existing equipment to control the water content of rubber mixtures produced thereby. Water content influences the workability of the rubber in the current mixing cycle and successive mixing cycles. Thus, while a threshold water content is expected, maintenance of the water content at or below the established threshold prevents premature vulcanization and preserves the integrity of the rubber's performance in its commercial embodiments. Moreover, such control enables predictable and repeatable mixing cycles having reduced cycle times. Enhanced productivity levels can therefore be planned and maintained while also maintaining beneficial rubber characteristics.

At least some of the various techniques described herein may be implemented in connection with hardware or software or, where appropriate, with a combination of both. For example, electrical data processing functionality may be used to implement any aspect of power computation and adjustment, including implementation in connection with a computing device (including a mobile networking apparatus) that includes hardware, software, or, where appropriate, a combination of both. The processing functionality may correspond to any type of computing device that includes one or more processing devices. The computing device can include any type of computer, computer system or other programmable electronic device, including a client computer, a server computer, a portable computer (including a laptop and a tablet), a handheld computer, a mobile phone (including a smart phone), a gaming device, an embedded controller, a near-field communication device, a device with applications implemented at least partly using a cloud service, and any combination and/or equivalent thereof (including touchless devices). Moreover, the computing device may be implemented using one or more networked computers, e.g., in a cluster or other distributed computing system. The network may be a LAN, a WAN, a SAN, a wireless network, a cellular network, radio links, optical links and/or the Internet, although the network is not limited to these network selections. A server may be further configured to facilitate communication between at least one module as presently disclosed and one or more of the computing devices.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." Also, the dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" refers to one or more steps that may be performed in other ordering than shown without departing from the scope of the presently disclosed invention. As used herein, the term "method" or "process" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention.

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. A process for controlling an addition of water to a rubber mixture during a mixing cycle in which the rubber mixture is transported as a continuous sheet along a transport route, the transport route including at least one spray system that sprays water on at least a portion of the continuous sheet, the water being controllably evacuated by at least one aspiration system, the process comprising steps of:
    obtaining data for the rubber mixture, the data including at least:
        a predetermined water flow rate for the at least one spray system,
        a predetermined air flow rate for the at least one aspiration system, and
        a target temperature value and a target water-content value for the rubber mixture;
    adding water to the continuous sheet of the rubber mixture while the rubber mixture is being prepared in the mixing cycle in progress;
    detecting an amount of water added at an elapsed time during the mixing cycle in progress;
    determining, using the amount of water detected in the detecting step, a predicted temperature value and a predicted water-content value for the rubber mixture at an end of the mixing cycle in progress;
    comparing the target temperature value with the predicted temperature value, and the target water-content value with the predicted water-content value; and,
    after the end of the mixing cycle in progress and before a next mixing cycle, adjusting an actual water flow rate for the next mixing cycle when a comparison result from the comparing step indicates non-equivalence between the target temperature value and the predicted temperature value, and between the target water-content value and the predicted water-content value.

2. The process of claim 1, further comprising steps of:
    evacuating air that contains evaporated water from the step of adding water; and
    transporting the continuous sheet in a predetermined direction during the steps of adding water and evacuating air,
    wherein the step of adding water includes spraying the continuous sheet while the continuous sheet is being transported proximate each of an upper spray station and a lower spray station of the at least one spray system, and
    wherein the step of evacuating air includes using the at least one aspiration system to evacuate air containing water from the spraying.

3. The process of claim 2, wherein the at least one spray system includes at least one rail positioned at each of the upper spray station and the lower spray station, each rail being in communication with a source of water and a source of air to supply water and air to one or more nozzles at the predetermined water flow rate and at a predetermined air pressure, and wherein the at least one aspiration system includes:
at least one aspiration hood positioned downstream of each rail, each aspiration hood being in communication with an apparatus for evacuating air at the predetermined air flow rate,
a heating element for heating a portion of the at least one aspiration system to prevent condensation of water from the spraying, and
a transport system for transporting the continuous sheet during the step of evacuating air.

4. The process of claim 3, wherein the at least one spray system includes a plurality of nozzles arranged linearly along a common axis perpendicular to an axis of circulation of the continuous sheet.

5. The process of claim 2, wherein:
the predetermined water flow rate is in a range of from about 40 liters/hour to about 400 liters/hour,
the predetermined air flow rate is in a range of from about 5000 m$^3$/h to about 30000 m$^3$/h,
the target temperature value is about 70° C., and
the target water-content value does not exceed about 0.20% by weight of the rubber mixture of the continuous sheet.

6. The process of claim 5, further comprising a step of:
repeating at least one of the detecting step, the determining step, the comparing step, and the adjusting step,
wherein the repeating step is performed iteratively until the comparison result indicates equivalence between the target temperature value and the predicted temperature value, and between the target water-content value and the predicted water-content value.

7. The process of claim 2, further comprising steps of:
using a detection system to detect the actual water flow rate, an actual air flow rate, and a presence of an ambient pressure suitable for producing atomizing air droplets, and to generate one or more signals indicative of the actual water flow rate, the actual air flow rate, and the presence of the ambient pressure suitable for producing atomizing air droplets; and
using a monitoring system to receive the one or more signals generated by the detection system, and to send one or more commensurate control signals to perform the adjusting step.

8. The process of claim 7, wherein the monitoring system includes a programmable controller in signal communication with the at least one spray system and the at least one aspiration system, and
wherein, in the obtaining step, the data is obtained from a plurality of established data values for a selected rubber mixture.

9. The process of claim 2, further comprising a step of:
adding a vulcanization product to the continuous sheet while the continuous sheet is being transported.

10. The process of claim 9, further comprising a step of:
before the step of adding the vulcanization product, allowing the target temperature value and the target water-content value to be reached.

11. The process of claim 1, further comprising steps of:
transporting the continuous sheet to an evacuation station, the evacuation station including at least one evacuation spray rail, each evacuation spray rail including at least one evacuation aspiration hood located downstream of the evacuation spray rail;
using each evacuation spray rail to spray the continuous sheet during the transporting step; and
using each evacuation aspiration hood to evacuate air containing evaporated water.

12. A system for controlling an addition of water to a rubber mixture being produced in a mixing cycle, the system comprising:
a mixer structured to form the rubber mixture into a continuous sheet;
a transporter structured to transport the continuous sheet during the mixing cycle;
a spray system structured to deliver water to the continuous sheet at a predetermined water flow rate;
an aspiration system structured to evacuate air at a predetermined air flow rate, the aspiration system being associated with the spray system;
a detector configured to detect during the mixing cycle: an actual water flow rate, an actual air flow rate for evacuated air containing evaporated water, and a presence of an ambient pressure suitable for producing atomizing air droplets, the detector being further configured to generate at least one signal corresponding to a detection result; and
a controller configured to receive the at least one signal from the detector and to:
determine a predicted temperature value and a predicted water-content value for the rubber mixture at an end of the mixing cycle,
compare a target temperature value with the predicted temperature value, and a target water-content value with the predicted water-content value, to obtain a comparison result and,
after the end of the mixing cycle and before a next mixing cycle, adjust the actual water flow rate for the next mixing cycle when the comparison result indicates non-equivalence between the target temperature value and the predicted temperature value, and between the target water-content value and the predicted water-content value.

13. The system of claim 12, wherein the mixer includes:
an internal mixer in which an elastomeric material is mixed with one or more ingredients to produce the rubber mixture, and
an external mixer that includes a pair of cylinders, the continuous sheet being formed between the pair of cylinders.

14. The system of claim 12, further comprising:
a vulcanization charging station structured to add one or more vulcanization agents to the rubber mixture after the rubber mixture reaches the target temperature value and the target water-content value.

15. The system of claim 12, wherein the detector includes:
a water flow sensor configured to detect the actual water flow rate at the spray system,
an air pressure sensor configured to detect the presence of the ambient pressure suitable for producing atomizing air droplets at the spray system, and
an air flow sensor configured to detect the actual air flow rate at the aspiration system.

16. The system of claim 12, wherein the spray system includes an upper spray station and a lower spray station, each spray station including at least one spray rail, each spray rail being in communication with a water supply source and an air supply source for supplying water and air to one or more nozzles at the predetermined water flow rate and at a predetermined air pressure, and wherein the aspiration system includes at least one aspiration hood located downstream of each spray rail, each aspiration hood being in communication with an apparatus for evacuating air at the predetermined air flow rate.

17. The system of claim 12, wherein the aspiration system includes a heating element structured to prevent condensation of sprayed water.

18. The system of claim 12, further comprising an evacuation station that includes:

at least one evacuation spray rail for spraying the continuous sheet with water, and at least one evacuation aspiration hood located downstream of each evacuation spray rail, for evacuating air containing evaporated water from the spraying, wherein the transporter is structured to transport the continuous sheet to a region proximate the evacuation station, and to unload the continuous sheet.

* * * * *